April 30, 1957  E. M. WILSON  2,790,518
HYDRODYNAMIC BRAKE WITH ROTOR PUMPS
Filed Nov. 3, 1951  3 Sheets-Sheet 1

INVENTOR.
ELDON M. WILSON
BY
Attorney

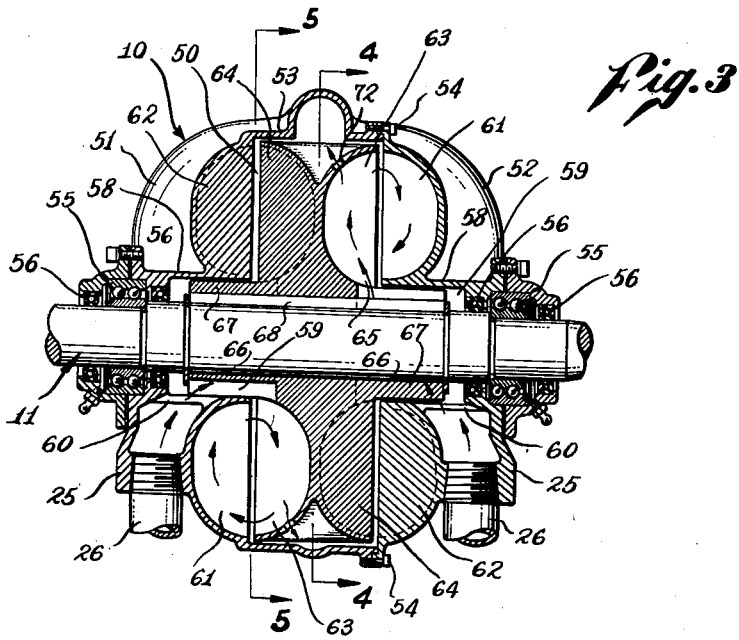

April 30, 1957 E. M. WILSON 2,790,518
HYDRODYNAMIC BRAKE WITH ROTOR PUMPS
Filed Nov. 3, 1951 3 Sheets-Sheet 3
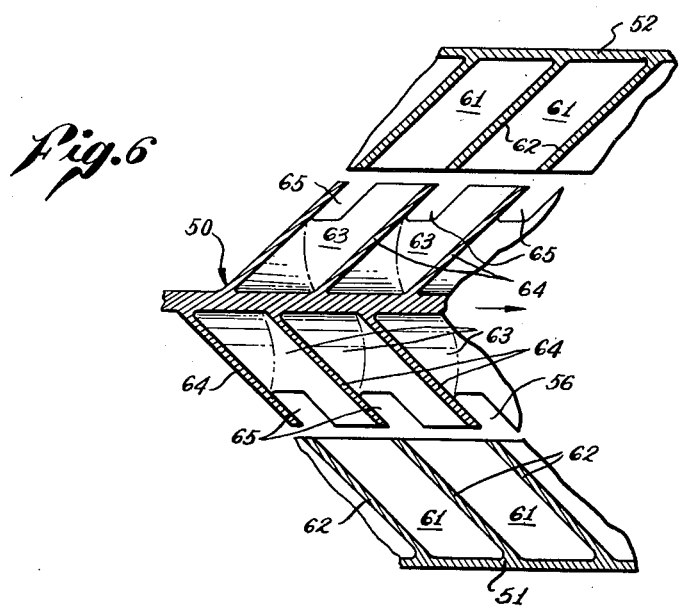
Fig.6
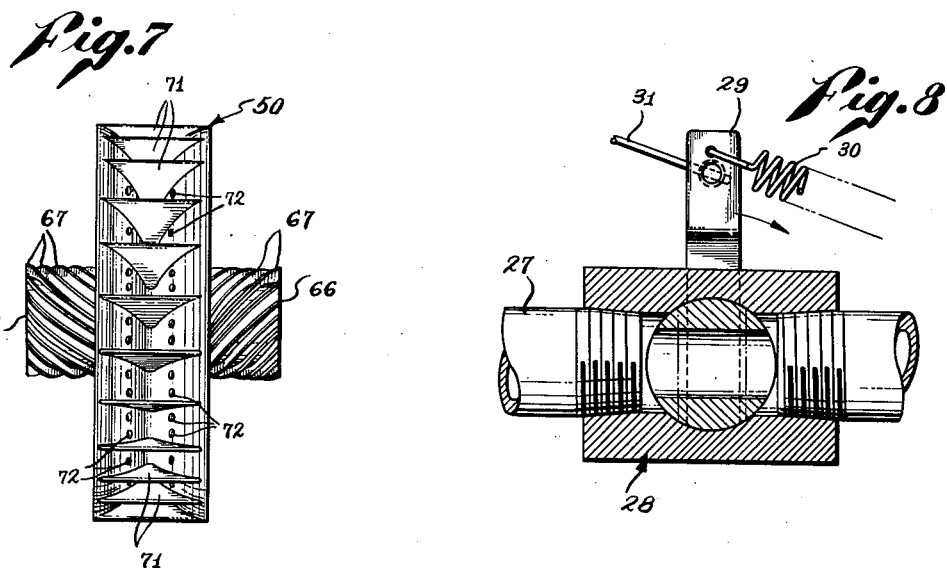
Fig.7
Fig.8
INVENTOR.
ELDON M. WILSON
BY
Attorney

United States Patent Office

2,790,518
Patented Apr. 30, 1957

2,790,518

HYDRODYNAMIC BRAKE WITH ROTOR PUMPS

Eldon M. Wilson, La Canada, Calif., assignor, by mesne assignments, to United States Spring & Bumper Co., Vernon, Calif., a corporation of California Application November 3, 1951, Serial No. 254,722

10 Claims. (Cl. 188—90)

This invention relates to vehicle brakes of the type in which a liquid is confined in a unit having a driven rotor element cooperating with at least one stator element, these elements cooperating in such manner that rotation of the rotor element is resisted by the confined liquid. Such brakes are highly useful for taking over control of the speed of a heavy vehicle during the descent of long grades with the conventional brakes of the vehicle idle but available when needed to bring the vehicle to a full stop or to meet any emergency that may arise. The fluid absorbs energy with consequent rise in temperature during such braking action and is continually circulated between the unit and a suitable heat exchanger for dissipation of the generated heat.

There are a number of different problems to be considered in the development of such a fluid brake for a heavy automotive vehicle, and it has been found to be exceedingly difficult to find a common solution for these problems in a final design suited for automotive vehicles where low weight, compactness and simplicity are of controlling importance. The construction of a practical and commercially acceptable hydrodynamic brake for a truck or a bus must go far beyond a solution that would be satisfactory for a stationary installation, such as an installation for retarding the descent of an elevator or the descent of objects into oil wells.

The general object of the present invention, then, is to bring all of the numerous factors and problems involved into one common solution to result in a compact, light weight and highly efficient hydrodynamic brake system for automotive use.

For a given truck load with a given gear ratio and given diameter of rear tires, a hydromatic unit of the type to be described herein, operating at the speed of the drive-shaft of the truck and containing the maximum quantity of retarding liquid, will provide a maximum horsepower resistance of say 700 H. P. at 2600 R. P. M. Thus a truck with a gross load of 60,000 lbs., a rear axle gear ratio of 8.5:1 will descend a maximum grade of 6% at a speed of 24 M. P. H. This speed is the minimum attainable under the given conditions with the maximum quantity of confined liquid. Lesser speeds may be obtained by lowering the liquid content prevailing in the unit as the liquid circulates between unit and heat exchanger.

In general, the problem of developing the hydrodynamic system for automotive use may be approached effectively by first considering in this way the maximum braking load to be imposed upon the unit, which maximum load means the minimum speed to be maintained with the maximum cargo on the maximum grade to be encountered in normal service of the vehicle.

The next consideration is heat dissipation. Some heat of course is dissipated by the air cooling of the hydrodynamic unit itself, but without liquid circulation into and out of the hydrodynamic unit it would be quickly heated under sustained load to the point of destroying itself. The amount of heat dissipated varies with the volumetric rate of flow through the unit and the temperature difference between the inflowing and outflowing liquid.

The manner in which the heat is dissipated is the dominating factor in determining the overall weight of the fluid brake system including the unit itself, the heat exchanger, the interconnecting piping, and the coolant liquid in the system. Heretofore brakes of this character have been connected with the radiator of the vehicle to use water from the engine cooling system. At first thought it would seem that using the cooling water for two purposes would result in substantial overall reduction in weight. In practice, however, it is found necessary to add water storage equipment of considerable volume to meet the combined heat-dissipating demands of the engine and the hydrodynamic brake. One reason for providing an exceptionally voluminous water supply is that usually a vehicle begins the descent of a long grade immediately after climbing an equivalent grade with resultant heating of the cooling water by the vehicle engine. The end result of adding the auxiliary water storage equipment together with the necessary extensive piping is to add several hundred pounds to the tare or net weight of the vehicle with corresponding reduction in the pay load capacity of the vehicle.

The present invention solves the heat dissipation problem and what may be termed the net weight problem largely by (1) providing a hydrodynamic unit that inherently operates with an exceptionally high rate of liquid circulation therethrough; (2) providing a separate highly efficient heat exchanger completely independent of the heating effects of the vehicle engine; (3) close coupling the hydrodynamic unit with the heat exchanger not only to favor circulation by minimizing frictional resistance to flow in piping but also to reduce the footage and weight of pipe; and (4) using as a coolant a liquid having a high boiling point together with other properties important for this particular purpose. Thus the present invention is characterized by the use of a relatively small volume of highly efficient liquid coolant with an exceptionally high rate of circulation, as distinguished from the use of a relatively large volume of less efficient coolant at a relatively low rate of circulation.

In general, these concepts are put into practice by employing a hydrodynamic unit that inherently creates a high rate of circulation of the new coolant and by combining such a unit on the driveshaft of the vehicle with an adjacent heat exchanger, the whole system being mounted compactly on the underside of the vehicle.

Another object of the invention is to minimize the deterioration of such a hydrodynamic brake system by corrosion and by leakage arising from corrosion. This object is accomplished by using a non-corroding coolant, preferably an oil that will not only serve its primary purpose of dissipating heat but will also serve as a lubricant for the moving parts. Such a coolant accomplishes the further object of the invention to provide a hydrodynamic brake system that will be immune from freezing in cold weather.

Other objects of the invention relate to the method of control with respect to varying the horsepower resistance of the hydrodynamic brake. Such control is used in accord with the different brake loads imposed by different grades and different cargo weights, or to provide a choice of speeds on a given grade with a given cargo weight. This problem of control, like the problem of the overall weight of the hydrodynamic brake system, cannot be separated from the problem of heat dissipation. As heretofore indicated, under given operating conditions of gross weight, gear-ratio and tire size, the horsepower resistance of the brake may be lowered to increase the speed of descent on a given grade simply by lowering the liquid content in the hydrodynamic brake unit. The paramount consideration of heat dissipation, however demands adequate circulation under all operating conditions, and any speed-control arrangement must be designed on this assumption.

In the present invention, the object of efficient speed control is accomplished by a novel combination of control valve on the inlet side of the brake unit with a fixed orifice member on the outlet side. In a given embodiment of the invention the size of the orifice will be determined by the maximum operating load to be imposed on the system. Thus, in the example heretofore given the maximum requirement is that the fluid brake system hold a 60,000 lb. vehicle at a sustained minimum speed of 24 M. P. H. on a 6% grade, and the orifice member is selected for size, say an orifice of 5/8" in a 1½" outlet pipe, to keep the hydrodynamic brake unit full of liquid for maximum braking effect when the inlet valve is wide open. Under these given conditions, progressively closing the inlet valve progressively lowers the volume of liquid prevailing in the brake unit. In this way the inlet valve, which may be termed the control valve, may be manipulated either to permit the loaded vehicle to travel faster on the maximum grade or to permit the loaded vehicle to travel at the same minimum speed or at a higher speed on a lesser grade.

If the same hydrodynamic brake system is installed on a lighter vehicle having a smaller maximum gross weight, say 50,000 lbs., a lower maximum liquid level in the unit will suffice to hold the speed down to 24. M. P. H. on the 6% grade. In such an installation a 7/8" orifice, for example, may be substituted for the 5/8" orifice to set the maximum liquid content prevailing in the unit at say 80% of the volumetric capacity of the unit, this content being sufficient to hold the fully loaded truck to 24 M. P. H. on the maximum grade. At the same time the 7/8" orifice will permit sufficiently high rate of fluid circulation through the system for effective dissipation of the generated heat.

In each of these two instances an equilibrium state is set up in the operation of the hydrodynamic brake system. In the first instance wherein the 5/8" orifice is employed, the constant minimum speed of 24 M. P. H. on the 6% grade involves an equilibrium in which the unit is filled with liquid to its maximum capacity and yet the rate of circulation through the unit is adequate to dissipate the generated heat to keep the coolant within its temperature limitations. In the second instance wherein the 7/8" orifice is used, the same constant speed on the 6% grade involves an equilibrium in which the liquid content prevailing in the unit is 20% less and while the rate of circulation is also less, it is nevertheless adequate.

It is to be noted that in both instances the control valve is at its maximum open position to limit the truck to the desired minimum speed on the 6% grade and herein may be seen an important advantage in the simple expedient of merely selecting orifice sizes to adopt a given embodiment of the invention to a wide range of trucks for a wide range of operating conditions. In each instance the selection of the proper orifice makes available the full range of movement of the control valve from its maximum open position to its closed position for graduated control of the braking action.

With respect to the construction of hydrodynamic unit itself, the object of attaining an inherent high capacity to circulate the coolant therethrough is attained by incorporating auxiliary pumping means to provide a booster pump action to work against the restricting effect of the orifice member, the booster pump action being preferably but not necessarily on both the inlet side and the outlet side of the unit.

The significance of this booster action with respect to the use of the orifice member for speed control may be appreciated from the fact that the rate of flow through an orifice varies with the pressure differential across the orifice, which pressure differential depends in turn on the pumping effectiveness of the unit. An orifice of a given size permits the volume of liquid in the unit to rise to a given quantity for a given adjustment of the control valve to absorb energy at a given rate under given operating conditions and the booster pumping action of the unit insures sufficiently rapid flow through the orifice for effective dissipation of the generated heat. A further important advantage of adding such a booster pump action to the unit is that the added effect prevents any tendency for reverse flow through the unit. Such a tendency for reverse flow has occurred unaccountably often enough to be a manufacturing problem.

The above and other advantages and objects of the invention may be understood from the following detailed description taken with the accompanying drawings.

In the drawings, which are to be regarded as merely illustrative,

Figure 3 is a longitudinal section through the unit taken as indicated by the line 3—3 of Figure 2;

Figure 4 is a medial transverse section taken as indicated by the line 4—4 of Figure 3;

Figure 5 is a similar section taken as indicated by the line 5—5 of Figure 3;

Figure 6 is a greatly enlarged fragmentary section taken as indicated by the line 6—6 of Figure 5;

Figure 7 is an edgewise view of the rotor of the hydrodynamic unit; and

Figure 8 is an enlarged section of the control valve taken as indicated by the line 8—8 of Figure 1.

*General arrangement*

Figure 1:
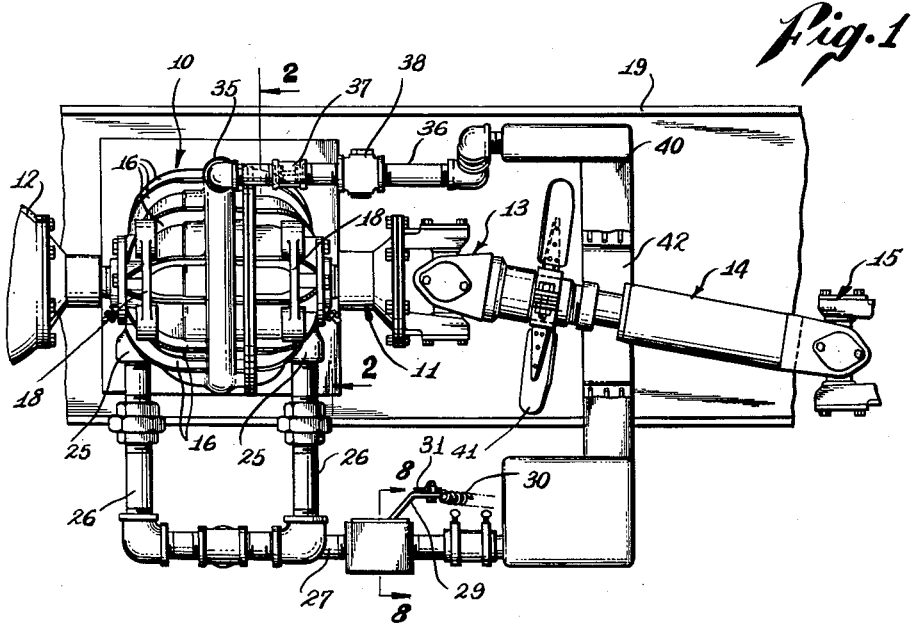
Figure 1 is a side elevation of a preferred embodiment of the invention incorporated in the understructure of a truck.
Figure 2:
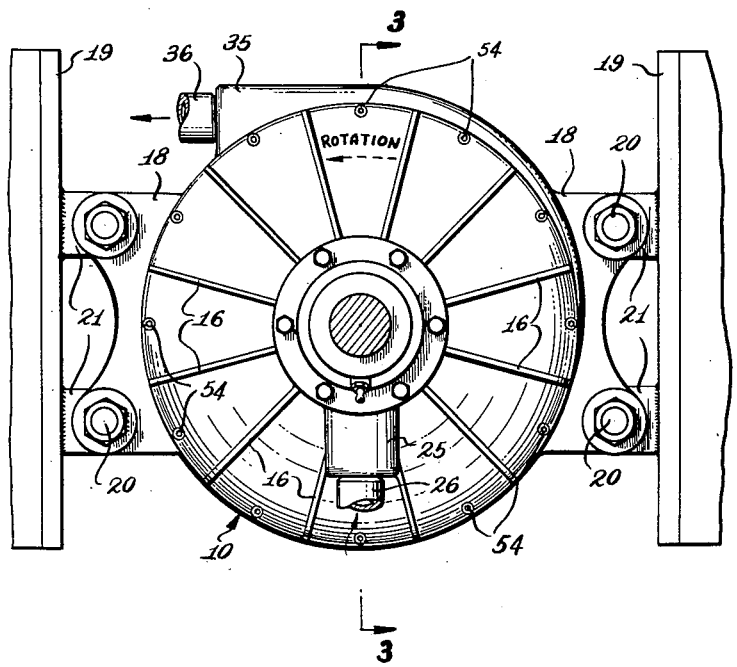
Figure 2 is a transverse section taken as indicated by the line 2—2 of Figure 1 showing the rear face of the hydrodynamic unit.

As may be seen in Figure 1, the hydrodynamic unit, generally designated 10, of a fluid brake system for a truck encloses a section 11 of the drive shaft that extends rearward from the engine 12 to a universal joint 13. From the universal joint 13 a second section 14 of the drive shaft extends to a second universal joint 15 for operative connection with the transmission of the truck. The unit 10 may have numerous cooling fins 16, and as may be understood from Figures 1 and 2, is preferably provided with two spaced wings 18 by means of which it may be adequately supported and held against rotation under high torque by connection with the two longitudinal frame members 19 of the truck chassis. As shown in Figure 2, each of the wings 18 is connected by suitable bolts 20 to heavy brackets 21 that are welded onto the frame members 19.

For the circulation of the coolant liquid through the unit 10, the unit is provided with two threaded inlet ports 25 into which are threadedly connected two inlet pipes 26 that branch from a main inflow pipe 27. The flow of coolant through the main inflow pipe 27 is regulated by a control valve generally designated 28 which may be a simple plug type valve constructed and arranged as shown in Figure 8.

The control valve 28 is shown with a handle 29 that is preferably in a lateral position when the valve is fully opened and is preferably connected to a suitable spring 30 that normally urges the valve to closed position thereby tending to put the fluid brake system out of operation. Suitable means including a cable or wire 31 connected to the handle 29 permits remote control of the brake system by the operator in the truck cab. The operator merely pulls the handle 29 to any position in its range of operating positions in accord with the braking action desired.

The unit 10 has a single threaded outlet port 35 connected to an outflow pipe 36 that is provided with a suitable orifice member 37 and preferably is also provided with a suitable check valve 38. The orifice member 37 may be of a well known type having a replaceable body or disk with an axial opening of the desired diameter.

The inflow pipe 26 and the outflow pipe 36 of the unit 10 are connected respectively to the outlet and inlet ports of a suitable heat exchanger 40. It is contemplated that the heat exchanger 40 will be closely coupled to the unit 10 and will therefore be located closely adjacent to the drive shaft of the vehicle. A feature of the present embodiment of the invention is the employment of a heat exchanger that at least partially surrounds the drive shaft of the vehicle. One advantage of this arrangement is that the heat exchanger may be cooled by the action of a suitable fan 41 mounted on the drive shaft. It will be noted in Figure 1 that the fan 41 is mounted on the downwardly inclined drive shaft section 14 to create a downwardly directed draft. Such a draft of air is directed across the unit 10 and being downwardly directed has minimum tendency to pick up foreign material under the traveling vehicle.

In the particular construction of the heat exchanger 40 shown in the drawings, the heat exchanger is of the general type employed as radiators in engine cooling systems and is provided with a central opening or window 42 through which the section 14 of the drive shaft extends.

Construction of the brake unit

Referring to Fig. 3, the hydrodynamic unit 10 includes a rotor generally designated 50 that is mounted on the drive shaft section 11 that extends through the unit. The casing or housing of the unit 10 may be termed a stator housing inasmuch as it provides stator elements for cooperation with the rotor 50. As may be understood by reference to Figures 3, 4 and 5, the unit housing provides a stator element 51 on one side of the rotor 50, a second stator element 52 on the opposite side of the rotor, and an intermediate peripheral wall 53. Each of the stator elements 51 and 52 is provided with one of the previously mentioned inlet ports 25 and the peripheral wall 53 is provided with the previously mentioned outlet port 35. As shown in Figure 3 the stator element 51 and the peripheral wall 53 may be integral with each other to form one housing section, the other stator element 52 being a separate housing section. These two sections may be assembled together in a fluid tight manner by suitable cap screws 54.

Each of the stator elements 51 and 52 includes a suitable anti-friction bearing 55 for the drive shaft section 11, and also includes suitable sealing means 56 to prevent the leakage of the coolant liquid at the two bearings. Each of the stator elements 51 and 52 has what may be termed a hub housing 58 that surrounds the drive shaft section 11 in spaced relation thereto and defines therewith an annular passage 59 around the drive shaft with an entrance 60 for fluid flow from the corresponding inlet port 25 to the corresponding face of the rotor 50. Each stator element 51 and 52 also provides a circular series of stator pockets 61 that face inwardly towards the rotor 50 and are semi-circular in cross-sectional configuration as may be seen in Figure 3. The stator pockets 61 are separated by thin walls or vanes 62 which are inclined as shown in Figure 6.

The rotor 50 provides on each of its two faces a circular series of rotor pockets 63 to cooperate with the corresponding stator pockets 61, the rotor pockets being likewise separated by thin walls or vanes 64 that are inclined as shown in Figure 6. As shown in Figures 3 and 6, each of the rotor pockets 63, which is of the same general semi-circular configuration as a stator pocket, is provided with a small port 65 for the inflow of liquid from the corresponding hub housing 58.

The desired boosting pump action may be provided in various ways in various practices of the invention, but in this instance is provided both in the region of the inlet to the unit and in the region of the outlet. The boosting action on the inlet side is accomplished by providing the rotor 50 with two hubs 66 for rotation in the annular passages in the two hub housings 58 and by further providing these two rotor hubs with helical pumping vanes 67 best shown in Figure 7, which helical vanes are preferably inclined against the direction of rotation to operate with a highly effective scooping action. Each of these two hubs 66 fit the drive shaft section 11 snugly with a suitable key 68 to fixedly engage the rotor with the shaft.

Boosting action on the outlet side of the unit is provided by forming the periphery of the rotor 50 with a series of pockets 70 separated by thin walls or vanes 71 that preferably slope in the manner shown in Figure 4. Suitable bores or apertures 72 in the rotor permit restricted centrifugal liquid flow from the rotor pockets 63 to the peripheral pockets 70. As best shown in Figures 3, 4 and 5, the intermediate peripheral wall 53 of the unit housing forms a graduated eccentric passage 73 leading to the outlet port 35 so that the rotor 50 with its peripheral pockets 70 and peripheral vanes 71 provides a centrifugal pumping action in the region of the outlet 35 to boost circulation of the coolant through the orifice member 37 of the system.

Operation

The operation of the fluid brake system may be readily understood from the foregoing description. When the control valve 28 is open to any degree while the drive shaft of the vehicle is actuating the rotor 50, the liquid of the system will circulate through the brake unit 10 and the heat exchanger 40 by reason of the pumping action performed by the rotor. On the inlet side of the unit 10, liquid admitted through each of the inlet ports 25 flows into the annular passage 59 defined by the hub housing 58 and the rotating drive shaft section 11, and in this annular passage the helical vanes 67 propel the liquid in a positive manner through the numerous stator ports 65 into the rotor pockets 63, the direction of flow being indicated by arrows in Figure 3. Since the outer ends of the rotor pockets 63 are curved back towards the corresponding stator, the liquid is thrown back into the stator pockets. Because of the shape and curvature of the stator pockets the liquid is directed downwardly and then in a circular path back into the inner ends of the rotor pockets 63 where the liquid is again caught up by the walls or vanes of the rotor and again thrown outwardly by centrifugal force.

Since the rotor under normal service conditions of operation on a long grade is rotating at relatively high speed the liquid thrown from rotor to stator and back again is in the form of high velocity jets that are continually cut as they continually make the passage between the stationary pocket-forming vanes of the stator and the rapidly moving pocket-forming vanes of the rotor.

Since this energy must come from the rotor driven by the drive shaft of the vehicle, the rotor is retarded with consequent retardation of the vehicle movement. The faster the rotor rotates the greater is the retarding effect, the effect increasing as the square of the speed of rotation. When the power expended by the rotor in cutting through the liquid and additionally expended by friction between the liquid and the walls of the various pockets rises to the level of equalling the kinetic energy imparted to the rotor by the vehicle drive shaft, acceleration of the vehicle speed ceases under the given conditions, and the vehicle coasts down the grade at a constant speed.

It is apparent that the magnitude of the retarding effect created by the hydrodynamic brake unit will vary with the quantity of liquid currently contained in the brake unit. If a relatively small quantity of liquid is flowing through the unit the jets of liquid continually recycled between the rotor and the two stators will be relatively small and consequently the power expended in energizing the jets will be small.

The centrifugal force created by the rotor 50 will cause a proportion of the liquid moving outward in the rotor pockets to be diverted radially outward through the bores 72 into the peripheral pockets 70 of the rotor where the liquid will be engaged by the walls or vanes 71 between the peripheral pockets and will be thrown centrifugally outward into the eccentric passage 73 leading to the outlet port 35. Additional liquid will escape centrifugally into the eccentric passage 73 through the clearance spaces between the two faces of the rotor and the corresponding faces of the two stators.

The quantity of liquid prevailing inside the brake unit while the fluid brake system is in operation will depend upon the size of the orifice in the orifice member 37 and the degree to which the control valve 28 is opened. As heretofore pointed out, when the described fluid brake system is mounted on a relatively large and heavy truck a relatively large orifice will be used and when the control valve 28 is wide open the brake unit 10 will be filled with liquid to its maximum capacity. On the other hand, when the system is installed on a lighter truck a smaller orifice will be employed so that opening the control valve 28 to its maximum open position will result in the brake unit 10 containing liquid to a lesser degree. In either installation, progressively closing the control valve 28 will progressively reduce the amount of liquid in the brake unit 10 under any given operating conditions. Thus the control valve offers a wide range of braking action from maximum retardation with the control valve wide open to zero retardation effect with the valve closed.

Because of the described inherent pumping action built into the brake unit 10 both on its inlet side and on its outlet side, the unit continuously tends to evacuate itself while the rotor is spinning and quickly accomplishes such evacuation whenever the control valve 28 is moved from an open position to its closed position.

The continual acceleration and deceleration of the velocity of the liquid as it is thrown alternately to the rotor and stator pockets together with the cutting of the high velocity liquid jets by the pocket-forming vanes and additionally the friction involved, all these actions work together to absorb energy from the rotor and this absorbed energy is transformed into heat which raises the temperature of the liquid. Heat is dissipated by providing for the high rate of liquid circulation through the system and by further providing for highly effective cooling action by the heat exchanger. The booster pump action built into the brake unit and the relatively small amount of pipe between the brake unit and the heat exchanger account for the required high rate of circulation. The heat exchanger under the vehicle is independent of the cooling system of the engine and made highly efficient by the fan on the drive shaft.

In a typical installation of the invention on a truck having a gross weight greater than 60,000 lbs. the normal temperature of the liquid which can be maintained indefinitely as the vehicle coasts down a long steep grade is in the range of 325° to 375° F. The liquid employed as the coolant in such an installation is preferably turbine oil SAE-7 which has a flash point of 650° F. Such an oil does not freeze in the coldest weather and, of course, lubricates all of the moving parts. The total quantity of oil in such a system is approximately 25 gals., the total weight of oil being less than half the weight of water required in fluid brake systems of this type heretofore in use. By using lightweight metals for much of the structure of the system for further weight saving, the total weight of the described fluid brake system for a heavy truck including the liquid is held down to approximately 800 to 900 lbs. This weight is half or less of the usual weight of a conventional fluid brake system using water and therefore increases the pay load of the truck by 800 to 900 lbs.

My description in specific detail of a preferred embodiment of the invention will suggest to those skilled in the art various changes, substitutions and other departures from my disclosure that properly lie within the scope and spirit of my appended claims.

Having described my invention, I claim:

1. A hydrodynamic brake system including: a stator casing having two intake ports on opposite sides thereof and a peripheral discharge port, said stator casing having two circular series of inwardly facing fluid pockets in communication with said intake ports respectively; a rotary assembly journaled in said casing to receive forces to be opposed by braking action; a rotor included in said rotary assembly between said two series of inwardly facing fluid pockets, the two faces of said rotor having outwardly facing fluid pockets to coact with said inwardly facing pockets; and a rotary pump means inside said casing between each of said intake ports and the corresponding series of stator pockets, each of said pump means being actuated by rotation of the rotary assembly to boost liquid into the region of said pockets; and additional pump means on said rotor cooperating with said stator for boosting liquid circulation from the region of said pockets.

2. A hydrodynamic brake system as set forth in claim 1 including means to supply liquid to said intake ports; a fixed orifice member to restrict the discharge of liquid from said stator casing; and an adjustable valve between said supply means and said casing to cooperate with said orifice member to regulate the quantity of fluid in said casing when the brake system is in operation.

3. A hydrodynamic brake system as set forth in claim 1 in which said additional pump means includes vanes on the periphery of said rotor forming peripheral pockets with apertures through the rotor walls communicating with said face pockets.

4. A hydrodynamic brake system for an automotive vehicle having a drive shaft, said brake system including: a stator casing enclosing a portion of the drive shaft of the vehicle, said casing having intake and discharge ports; a rotor in said casing mounted on said enclosed portion of the drive shaft, said casing and rotor having coacting fluid pockets; a heat exchanger connected to said ports to cool liquid circulated through said casing, said heat exchanger surrounding said shaft, said stator casing and said rotor cooperating to pump fluid from the stator casing to the heat exchanger; and means including a valve on the intake side of said stator casing to control flow from the heat exchanger to the casing.

5. A hydrodynamic brake system as set forth in claim 4 which includes a fan on said drive shaft to cool said heat exchanger.

6. A hydrodynamic brake system as set forth in claim 5 in which said drive shaft includes a universal joint with a portion of the drive shaft inclined downwardly from said universal joint and in which said fan is mounted on said downwardly inclined portion of the drive shaft to direct an air stream downwardly toward said heat exchanger.

7. A hydrodynamic brake system for an automotive vehicle having a drive shaft, said brake system including: a stator casing having two intake ports on opposite sides thereof and a peripheral discharge port, said stator casing having two circular series of inwardly facing fluid pockets in communication with said intake ports respectively; a rotary assembly including a portion of said drive shaft journaled in said casing; a rotor included in said rotary assembly between said two series of inwardly facing fluid pockets, the two faces of said rotor having outwardly facing fluid pockets to cooperate with said inwardly facing pockets; a rotary pump means inside said casing between each of said intake ports and the corresponding series of stator pockets, each of said pump means being actuated by rotation of the rotary assembly to boost liquid circulation through the casing; a heat exchanger adjacent said drive shaft connected to said ports to cool liquid circulated through the casing; means on said rotor cooperating with said stator to boost liquid circulation from said casing to said heat exchanger; fixed means on the discharge side of said stator casing to restrict flow from the casing to the heat exchanger; and valve means on the inlet side of said stator casing to cooperate with said restricting means to determine the quantity of liquid in the stator casing when said drive shaft is rotated.

8. A hydrodynamic brake system as set forth in claim 7 which includes a fan on said drive shaft to cool said heat exchanger.

9. A hydrodynamic brake system as set forth in claim 8 in which said heat exchanger surrounds said shaft and said fan is mounted on a downwardly inclined portion of the shaft to direct air downwardly to the heat exchanger.

10. A hydrodynamic brake system for an automotive vehicle having a drive shaft, said brake system including: a stator casing enclosing a portion of the drive shaft of the vehicle, said casing having intake and discharge ports; a rotor in said casing mounted on said enclosed portion of the drive shaft, said casing and rotor having coacting fluid pockets; a heat exchanger adjacent said drive shaft connected to said ports to cool liquid circulated through said stator casing; a fixed orifice member on the discharge side of said stator casing to restrict flow from said casing to the heat exchanger thereby to set maximum braking effect of the system; an adjustable valve on the intake side of said stator casing to cooperate with said orifice member to regulate the quantity of fluid in said brake system for lesser braking effects when the system is in operation; auxiliary pumping means formed by said stator casing and rotor on the inlet side of the casing to force fluid into said coacting pockets; and a plurality of vanes on the periphery of said rotor to boost discharge flow from said casing.

References Cited in the file of this patent
UNITED STATES PATENTS

| | | |
|---|---|---|
| 1,228,215 | Junkers | May 29, 1917 |
| 1,915,547 | North et al. | June 27, 1933 |
| 1,992,910 | De La Mater | Feb. 26, 1935 |
| 2,113,109 | De La Mater | Apr. 5, 1938 |
| 2,341,122 | Schmidt | Feb. 8, 1944 |
| 2,425,171 | Bennett et al. | Aug. 5, 1947 |
| 2,428,005 | Bennett | Sept. 30, 1947 |
| 2,496,497 | Russell | Feb. 7, 1950 |
| 2,672,953 | Cline | Mar. 23, 1954 |